United States Patent Office 3,340,934
Patented Sept. 12, 1967

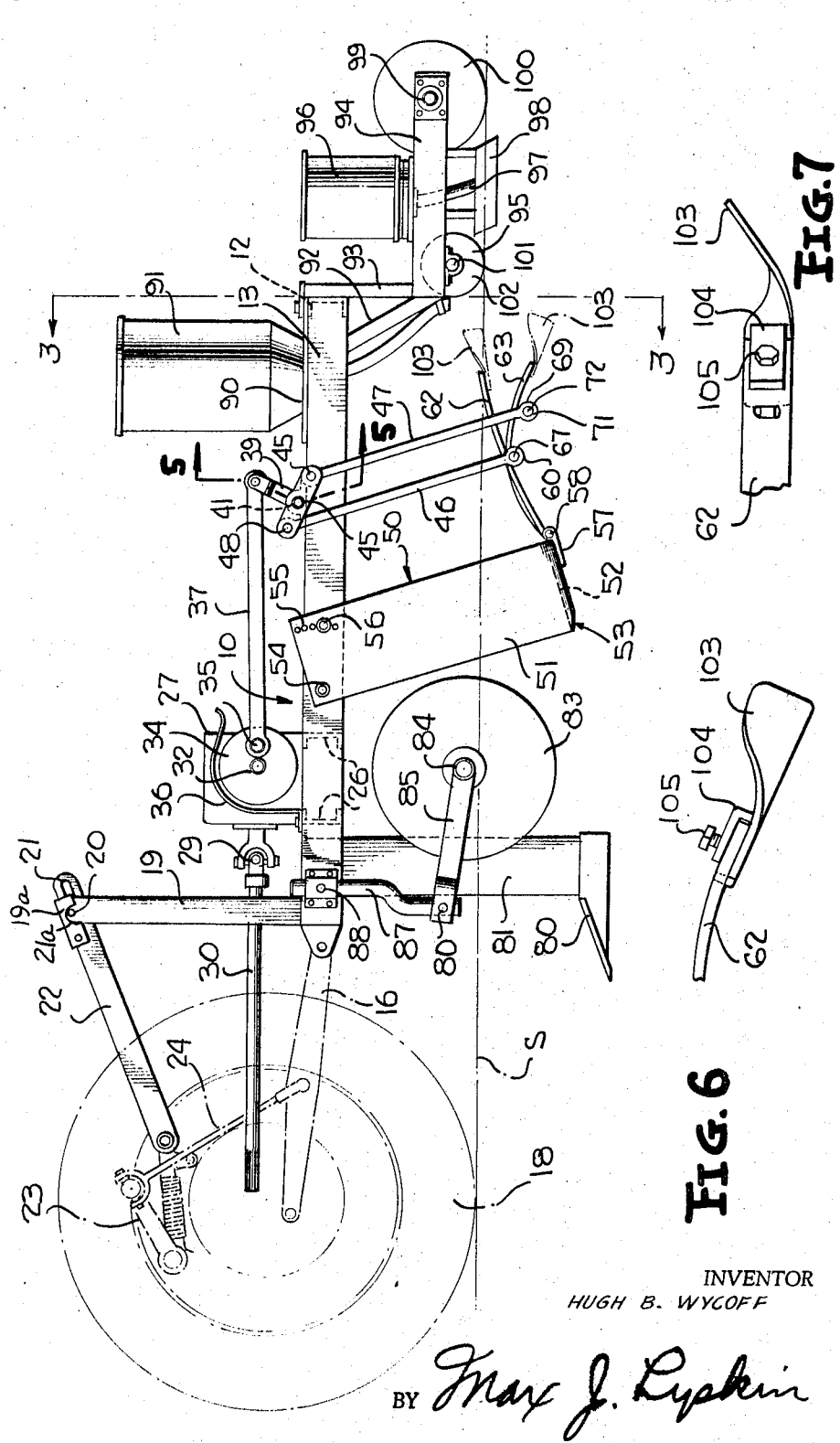

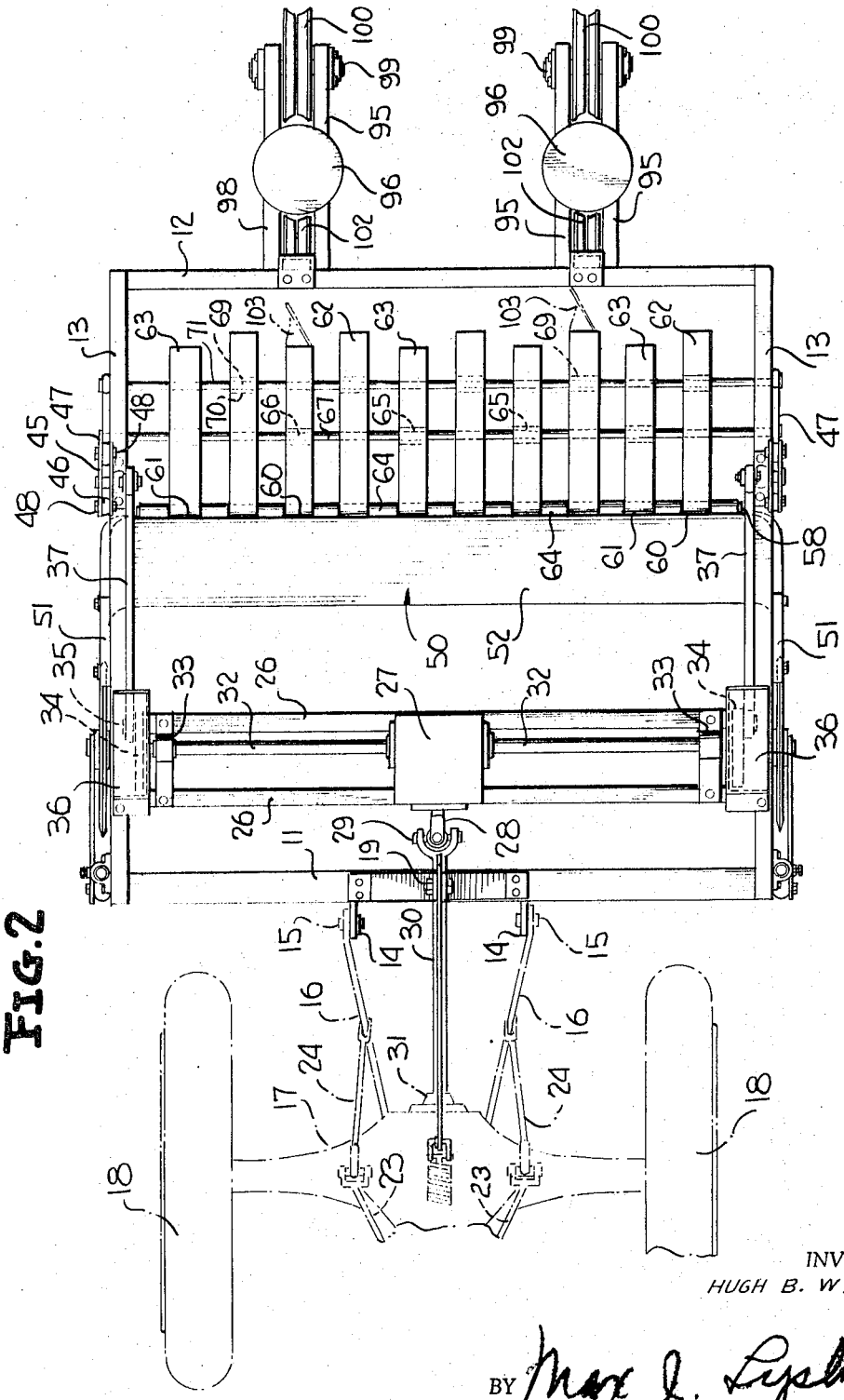

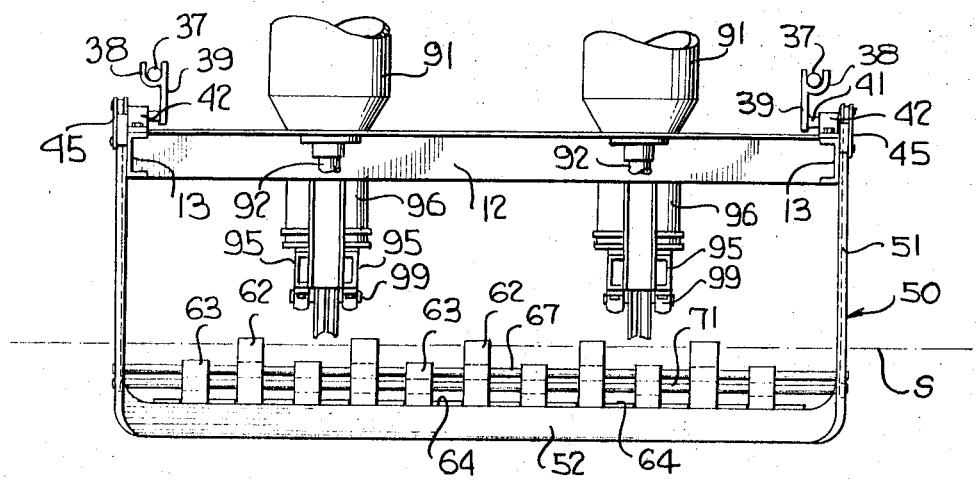
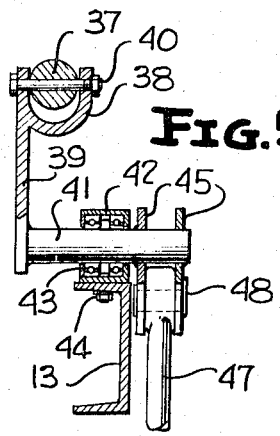
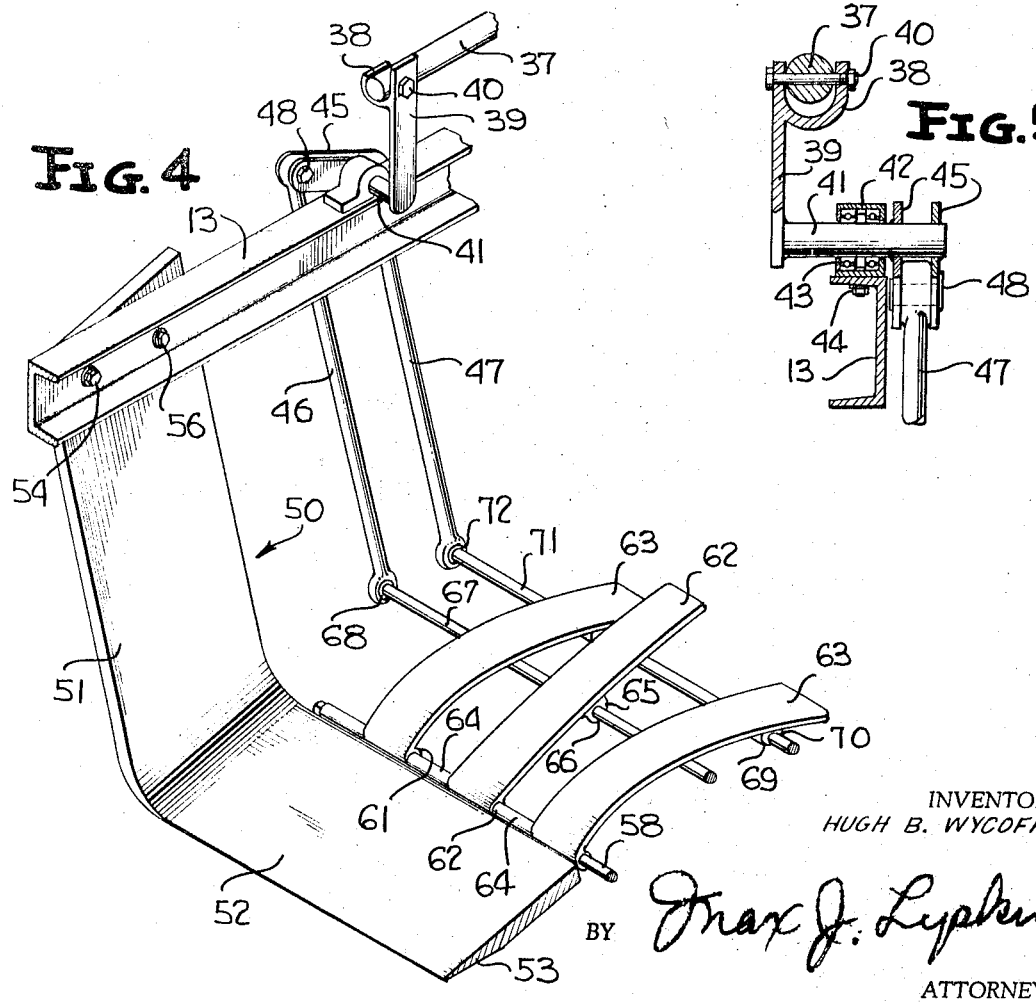

3,340,934
AGRICULTURAL IMPLEMENT
Hugh B. Wycoff, Topeka, Ill. 61567
Filed May 5, 1964, Ser. No. 365,210
23 Claims. (Cl. 171—5)

ABSTRACT OF THE DISCLOSURE

This disclosure relates to agricultural implements for tilling soil. A sharp edged, U-shaped blade is drawn beneath the soil at a predetermined depth. Vertical oppositely reciprocating tines are provided attached to the blade and trailing therefrom for breaking up lump formations of the soil. The device is adapted to return the tilled soil to its essentially original position, and is normally mounted behind a tractor.

---

This invention relates to an agricultural implement, and more specifically to an implement for tilling the soil.

A primary object of this invention is the provision of an implement which tills the soil by alternate vertical reciprocation of blades or tines of diverse configurations which are introduced beneath the surface of the soil by means of a sharp-edged horizontal blade.

A further object of the invention is the provision of a device of this character wherein the soil is tilled so that the organic matter is left on the surface where it conserves moisture and reduces wind and water erosion, thus avoiding the covering up of organic matter exposing the subsoil to wind and water erosion and rapid oxidation, as is the case with hitherto known tilling apparatus.

A further object of the invention is the provision of a device of this character which is readily adapted to deep or shallow operation for either crop production or weed control and fallowing.

An additional object of the invention is the provision of a device of this character which incorporates only reciprocating movable parts beneath the surface, thus obviating the necessity for sealed bearings or the like as is the case with implements which have rotating parts in or near the soil.

Still another object of the invention is the provision of a device which requires a minimum amount of power to pull the blade through the soil, since soil movement is at a minimum in proportion to the tillage accomplished.

Still another object of the invention is the provision of a device of this character wherein the blade is substantially self sharpening due to the weight of the soil on the blade and the firm soil under the blade.

Still another object of the invention is the provision of an implement of this character which, by lifting the soil vertically and allowing it to fall back in place rather than moving it laterally as is conventional, leaves a level surface without large furrows or ridges.

Still another object of the invention is the provision of such a device wherein the vertical reciprocation or agitation of the tines pulverizes the soil passing over them, rather than throwing up large chunks or slices of soil.

Still another object of the invention is the provision of such a device wherein vegetative material is loosened at whatever depth desired and left on the surface, shallow operation serving to sever the roots of undesirable vegetation and shake the soil from the roots, leaving the weeds to die on the surface.

A still further object of the invention is the provision of such a device which unearths small underground objects such as stones, or vegetation such as potatoes or beets and brings them to the surface for gathering.

An additional object of the invention is the provision of a device of this character which is sturdy and durable in construction, reliable and efficient in operation, and relatively simple and inexpensive to manufacture.

A further object of the invention is the provision of such a device which lends tiself readily to the association of additional implements therewith, such as rolling colters, sub-soiler points, seed drills or planter units, fertilizer spreaders, herbicide equipment, or deflectors, which may be attached to agitator tines to move surface trash laterally as desired.

Other objects will in part be obvious and in part be pointed out as the description of the invention proceeds and shown in the accompanying drawings wherein there is disclosed a preferred embodiment of this inventive concept.

In the drawings:

FIG. 1 is side elevational view of an agricultural implement constructed in accordance with the instant invention showing a plurality of optional implements which may be associated therewith and employed either individually or in multiple;

FIG. 2 is a top plan view of the appartus of FIG. 1, with certain parts removed for clarity;

FIG. 3 is a sectional view taken substantially along the line 3—3 of FIG. 1 as viewed in the direction indicated by the arrows, parts thereof being broken away;

FIG. 4 is an enlarged fragmentary perspective view showing certain details of construction;

FIG. 5 is an enlarged sectional view taken substantially along the line 5—5 of FIG. 1 as viewed in the direction indicated by the arrows;

FIG. 6 is a fragmentary side elevational view of one of the tines showing an attachment positioned thereon, and FIG. 7 is a top plan view of the tine of FIG. 6.

Similar reference characters refer to similar parts throughout the several views of the drawings.

Having reference now to the drawings in detail, the device of the instant invention consists of a frame generally indicated at 10 which is preferably constructed of relatively heavy channel iron, and includes a transverse front bar 11, a rear bar 12 and a pair of substantially identical side bars 13. The front bar 11 has secured thereto a pair of forwardly extending apertured lugs 14, the lugs being spaced apart and being adapted to be secured as by means of bolts 15 to the arms or lift arms 16 of the conventional three-point hitch of a tractor or the like, the rear axle of which is indicated at 17, and the drive wheels of which are indicated at 18. A centrally positioned mast 19 extends upwardly from the midpoint of front member 11 and is provided with a bolt 20 which extends through the slot 21 of a conventional top link 22. The top link 22 is of an adjustable construction, as for example, by multiple bars adjustably bolted together, a hydraulic cylinder, a turnbuckle mechanism, or similar adjusting mechanisms. A pivoted or hinged catch 19a having locking slot 21a can be provided to lock the pin 20 in the forward end of the slot 21 when desired to obtain optimum soil penetration when the soil is dry or hard. The entire assembly is thus adapted to be raised and lowered when in use or otherwise by the lift arms 23 conventionally associated with a tractor and its associated linkage 24. Thus the implement and its associated parts may be raised or lowered in the conventional manner as desired.

A pair of flat transverse bars comprising the tops of channel irons 26 extend transversely between the side members 13 rearwardly of front member 11 and support a conventional gear box 27 which is provided with a power shaft 28 which is connected through a universal joint 29 to the power shaft 30 which extends from the power take-off 31 of the towing vehicle. The power shaft 30 is connected to the power take-off 31 through a conventional universal joint (not shown) similar to the universal joint 29.

Laterally extending drive shafts 32 extend from opposite sides of gear box 27 through journals 33 which are suitably mounted on bars 26 and have mounted at their extremities drive wheels 34 which carry pitmans 35. Conventional guard shields 36 extend over the wheels and their associated pitmans. Each pitman 35 is connected to a pitman arm 37 which extends rearwardly of the frame and has its extremity seated in a fork 38 carried by an arm 39. A bolt 40 passes through a bushing (not shown) secures the end of each pitman arm 35 in the fork. The other end of each arm 39 is provided with a right-angularly offset shaft 41 which extends through a housing 42 containing a bearing assembly 43 bolted as by means of bolts 44 to the top rail of the adjacent channel iron 13. The opposite end of each shaft 41 has fixedly secured thereto, as by welding, a pair of spaced links or rocker arms 45 between the opposite ends of which are connected the extremities of parallel drive rods 46 and 47 by means of bolts 48 housed in conventional bushings (not shown). The shaft 41 is connected to the rocker arms 45 at a point closer to the rods 46 than to the rods 47 whereby the rear ends of tines to be described immediately hereafter will travel the same vertical distances and are in alignment when centered. The purpose and function of the drive rods 46 and 47 will be described more fully hereinafter.

Positioned forwardly of the rods 46 and 47 is a tiller blade assembly generally indicated at 50 which is of generally U-shaped configuration and includes a pair of vertical plates 51 and a transverse bight or blade member 52 which is sharpened on its under side as at 53. The forward edges of the plate-like members 51 can be similarly sharpened to a point above ground level (not shown) and upper edges thereof are apertured to receive bolts 54 which pivotally secure the front edge of the assembly to the side frame members 13. A series of arcuately arranged openings 55 are formed in the rear edge of each plate 51 and are adapted selectively to receive opposite bolts 56 for varying the angle of inclination of the blade 52.

A bar 57 secured to the under side of the rear edge of blade 52 and extending the entire length thereof supports a transverse rod 58 passing through sleeves 60 and 61 at the ends of alternate tines 62 and 63. The tines are located between collars or sleeves 64 attached to the rear edge of the bar 57 through which the rod 58 passes. The rod 58 thus serves as a hinge joint allowing the tines 62 and 63 to move freely.

The tines 62 are curved or bent slightly as compared to the curvature of the tines 63, as is best illustrated in FIG. 1 of the drawings. However, the curvature of the tines 62 and 63 can be identical and can vary between the relatively slight curvature of the tines 62 to the greater curvature of the tines 63. The tines 62, 63 are also essentially in the same plane of inclination as the blade 52 to minimize drag as soil slides over the blade 52 and tines 62, 63.

Each of the tines 62 is provided at a point normally forward of the midpoint thereof with a depending lug 65, through which extends a transverse bore 66, all of the bores 66 being aligned and surrounding a transverse rod 67 which has its opposite ends engaged in openings 68 in the enlarged ends of rods 46. Similar lugs 69 depend from the under side of each of tines 63 at a point adjacent their free ends. The lugs 69 are longer and spaced further from the blade 52 than the lugs 65 to provide clearance for the rod 67 beneath the tines 63. The lugs 69 are also provided with aligned transverse bores 70 which surround a rod 71, the opposite ends of which are engaged in openings 72 in the enlarged ends of rods 47.

From the foregoing the use and operation of the tilling apparatus should now be readily apparent. As the pitman 35 rotates, drive rod 37 moves the arm 39, which in turn alternately raises opposite ends of the rocker arms 45, which in turn alternately raise and lower the drive rods 46 and 47. As the ends of these rods are alternately raised and lowered, the tines 62 and 63 are alternately lowered by means of the transverse rods 67 and 71. This arrangement serves gently to till the soil which is loosened by the sharpened edge 53 of blade 52. By adjustment of the angle of the blade through the positioning of bolts 56 in selected holes 55, either deep tillage for crop production or shallow tillage for weed control and fallowing may be achieved. The absence of rotating parts below the surface of the ground reduces the care and parts replacement necessary in the apparatus and eliminates the need for shielding, sealing, or the use of lubricated bearings. Since there is a minimum of soil movement in proportion to the tillage accomplished, a minimum amount of power is required to pull the blades through the soil, while the firm soil under the blade, coupled with the weight of the machine and the soil on the blade, serves continually to sharpen the blade during operation. By virtue of the arrangement of the agitator tines, the soil is lifted vertically and allowed to fall back in place rather than moving it laterally as with a plow, which provides a level surface without large furrows or ridges. Similarly, the vertical agitation of the tines pulverizes the soil passing over them rather than throwing up large chunks or slices of soil. Similarly, the soil particles tend to remain in their original position while being loosened and mixed. The deeper, less fertile soil is not brought up and placed on top of the surface although there is some uniform mixing of soil from various depths. Vegetative material is loosened at whatever depth desired and is left on the surface, shallow operation severing the roots of undesired vegetation and shaking the soil from the roots, leaving the weeds to die on the surface.

Similarly, deeper operation will loosen the soil to facilitate feeding, planting or the removal of desirable plants and their roots with a minimum of injury to the root systems, while underground objects such as potatoes and beets, or stones are brought to the surface for gathering. The method of tillage also leaves a mulch of any plant material present on the surface to conserve moisture.

The device may be employed alone or in combination with any or all of a relatively large number of additional agricultural implements. For example, as shown in FIG. 1, one or more sub-soiler points 80 carried by depending members 81 may be suitably affixed to the transverse front channel iron 11. Similarly a plurality of rolling colters 83 may be provided mounted on sub-axes 84 which are carried at the ends of arms 85, the latter being pivotally connected as at 86 to depending rods 87 mounted in brackets 88 which may be secured to the frame member 13, or alternatively to the rear of front frame member 11. Preferably only two rolling colters are employed in front of each blade portion 51 to cut vegetation when present.

If desired, a plate 90 may be mounted across the rear of the frame and support a fertilizer tank 91 from which fertilizer tubes 92 lead downwardly. The tubes 92 may be attached to depending supports 93 secured to the rear member 12 of the frame, the supports in turn carrying a pair of rearwardly extending subframe members 94, the subframe members 94 each being comprised of a pair of channels 95 which serve to support seed bins 96 from which planter units 97 extend between seed guides 98 which penetrate below the soil surface which is indicated at S. Axles 99 may extend across the rear of members 95 to support seed rollers 100, while similar axles 101 adjacent the forward end of the subframes 94 may carry supporting wheels 102.

Any or all of these attachments may be permanently affixed to the frame or attached thereto as needed or desired, and may be used individually or in any desired combination.

Under certain circumstances when it is desired to move trash laterally from the front of the seeding units, or when it is desired to provide clean soil surface for any other purpose, deflectors 103 may be mounted on the ends of tines 62 or 63 either directly in front of the planter units, or in other adjacent tines. Such deflectors are generally wedge or fan shaped as shown in FIGS. 6 and 7, and may include sleeves or collars 104 provided with set screws 105 for securing the same to the ends fo their associated tines. To allow soil, roots and trash to slide smoothly over the tines 62, 63 the set screws 105 can be positioned beneath the tines. Other securing means, such as countersunk, flat headed plow bolts could be substituted for the set screws 105 from above and pass through the tines 62, 63 to attach the deflectors 103 beneath the times without the sleeves or collars 104. With this latter construction the deflectors 103 can be provided with shoulders butting the rear edges (unnumbered) of the tines 62, 63 to hold the deflector accurately positioned. If desired, tapered holes near the ends of the tines receiving tapered flat-head bolts or carriage bolts with round heads could be employed to attach the deflectors.

From the foregoing it will now be seen that there is herein provided a soil tilling implement together with attachments therefor, which accomplishes all of the objects of this invention, and others, including many advantages of great practical utility, and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A soil tilling implement comprising, in combination, a frame, a substantially U-shaped blade depending from said frame, a plurality of rearwardly extending soil tilling tines pivotally secured for vertical movement adjacent the rear edge of said blade, means carried by said frame for oscillating said tines in a vertical plane, said oscillating means including a pair of generally parallel rods, means articulately securing alternate ones of said tines to one of said rods, means further articulately securing alternate ones of said tines to the other of said rods, and means for imparting oscillating movement to said rods whereby said tines are similarly oscillated.

2. A soil tilling implement comprising in combination, a frame, a substantially U-shaped blade depending from said frame, a plurality of rearwardly extending soil tilling tines pivotally secured for vertical movement adjacent the rear edge of said blade, means carried by said frame for oscillating said tines in a vertical plane, said oscillating means including a pair of generally parallel rods, means articulately securing alternate ones of said tines to one of said rods, means further articulately securing alternate ones of said tines to the other of said rods, and means for imparting oscillating movement to said rods whereby said tines are similarly oscillated with alternate tines moving in alternate vertical directions.

3. A soil tilling implement comprising, in combination, a frame, a substantially U-shaped blade depending from said frame, a plurality of rearwardly extending soil tilling tines pivotally secured for vertical movement adjacent the rear edge of said blade, means carried by said frame for oscillating said tines in a vertical plane, with alternate tines moving in alternate vertical directions, said last-mentioned means including a pair of transverse rods connected to the under side of said tines with alternate tines secured to different rods, one vertical drive rod connected to each end of each transverse rod, the opposite ends of the vertical rods connected to one transverse rod being connected each to one end of one of a pair of pivoted rocker arms carried by said frame, and the opposite ends of the vertical rods connected to the other transverse rod being each connected to the opposite ends of one of said pair of rocker arms, and means for rocking said rocker arms about their pivot points.

4. The structure of claim 3 wherein the means for rocking said rocker arms comprises a central arm extending from each link, a pitman rod pivotally connected at one end to each central arm, a transverse drive shaft having a central gear box, and a pitman wheel on each end of said shaft, means connecting the pitman wheels to the other ends of the pitman rods, and means for rotating said drive shaft through said gear box.

5. The structure of claim 4 including means adapted to secure said frame to a tractor for support thereby, said last-mentioned means being adapted for connecting said frame to the lift arms of a tractor for raising and lowering the same, and wherein the means for rotating said drive shaft through said gear box comprises means adapted to connect said gear box to the power take-off of a tractor.

6. The structure of claim 4 including means for varying the angular relation of said blade.

7. The structure of claim 6 wherein said frame is generally rectangular and includes a front member, a rear member and side members, and wherein the legs of said U-shaped blade are attached to the side members, and plant cutting colters are secured to the side members in advance of each leg.

8. The structure of claim 7 wherein subsoil plow points are attached to the front member in advance of said blade.

9. The structure of claim 3 wherein certain of said tines are provided with deflectors for moving material laterally.

10. A soil tilling implement comprising, in combination, a frame, blade means carried by said frame, means for varying the pitch of said frame, a plurality of soil working tines pivotally secured rearwardly of said blade means, means for oscillating said tines in substantially a vertical plane by means of transverse rods movable vertically at the rear of the tine pivot points, and lugs spacing the rods and tines to permit free relative movement of the rods and tines.

11. The structure of claim 10 including means for contrilling the pitch of the frame, said pitch controlling means including an adjustable link secured to said frame at a forward portion thereof and adjusted for insertion to a tractor.

12. The structure of claim 11 wherein said adjustable link is secured to a generally vertical mast of the frame by a movable slotted connection.

13. The structure of claim 12 including means restricting the movement of the slotted connection, thereby preventing the implement from uncontrollably changing its angular relationship to the ground.

14. The structure of claim 11 including means for removing said blade means and tines from the soil, said blade removing means having means for connection to the lift arms of a tractor.

15. The structure of claim 11 including an adjustable link in a multiple acting hydraulic cylinder.

16. A soil tilling implement comprising, in combination, a frame, blade means carried by the frame, a plurality of soil working tines independently pivotally secured rearwardly of said blade means, a pair of rods, means spacingly connecting one of the rods to a first of the plurality of tines and further spacing connecting a second of the rods to a second of the plurality of tines, and means for moving the pair of rods whereby noninterfering movement is imparted to the tines by the last mentioned means.

17. The structure of claim 16 wherein the last mentioned means connects the rods beneath the tines, and the moving means alternately sequentially raises and lowers the first and second plurality of tines.

18. The structure of claim 3 wherein said frame is generally rectangular and includes a front member, a rear member and side members, the legs of said U-shaped blade are attached to said frame, and plant cutting colters are secured to said frame in advance of each leg.

19. A soil tilling implement comprising a frame, a substantially U-shaped blade member depending from said frame, a plurality of rearwardly extending soil tilling tines each individually pivotally secured for vertical movement adjacent the rear edge of said blade, and means for oscillating adjacent tines in opposite directions and in alternating directions.

20. The soil tilling implement as defined in claim 19 wherein said oscillating means includes a pair of rods pivotally connected to said tines rearwardly of said blade, and means for oppositely moving said rods in a generally vertical plane.

21. A soil tilling implement comprising a frame, a substantially U-shaped blade member depending from said frame, a plurality of rearwardly extending soil tilling tines each individually pivotally secured for vertical movement adjacent the rear edge of said blade, and means carried by said frame for oscillating said tines in a vertical plane, said tines being curved to open concavely downwardly, said oscillating means including rod means disposed beneath said tines, and said rods being coupled to the tines for effecting movement thereof upon relative movement of said rod means.

22. A soil tilling implement including a blade having forwardly and rearwardly disposed end portions, means individually mounting a plurality of tines at the rearward end portion of said blade, means spacing each tine from an adjacent tine, means for oscillating said tines in a vertical plane, said oscillating means including rod means pivotally coupled to said tines, and means for moving said rod means to cause oscillation of said tines in a generally vertical plane.

23. The soil tilling implement as defined in claim 22 wherein said rod means is disposed rearwardly of said blade rearward end portion.

References Cited
UNITED STATES PATENTS

| | | | |
|---|---|---|---|
| 357,260 | 2/1887 | Young | 171—74 |
| 480,590 | 8/1892 | Kelly et al. | 171—76 |
| 533,288 | 1/1895 | Goodell | 171—76 |
| 650,331 | 5/1900 | Lewis | 171—71 |
| 704,169 | 7/1902 | Andrews | 171—75 |
| 726,549 | 4/1903 | Lilly | 171—71 |
| 2,405,980 | 8/1946 | Sands et al. | 172—439 X |

FOREIGN PATENTS

| | | |
|---|---|---|
| 576,815 | 6/1959 | Canada. |
| 990,117 | 5/1951 | France. |
| 1,347,361 | 11/1963 | France. |
| 13,132 | 1892 | Great Britain. |

ABRAHAM G. STONE, *Primary Examiner.*

R. L. HOLLISTER, *Assistant Examiner.*